July 10, 1962
P. H. METZLER
3,043,044
FISHING SINKERS
Filed June 9, 1959
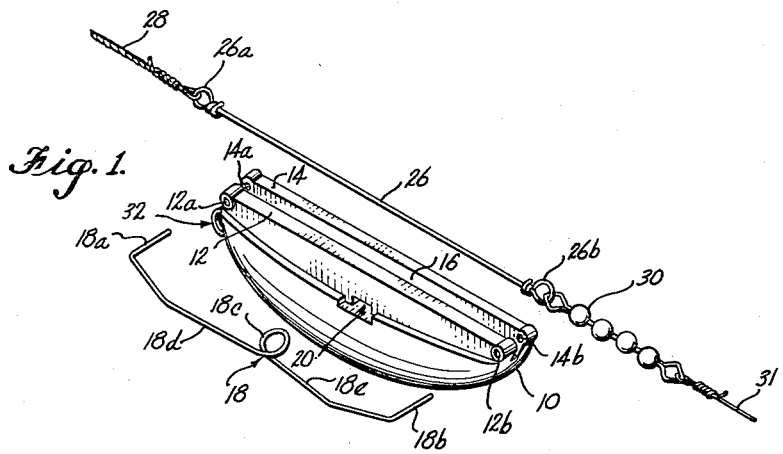
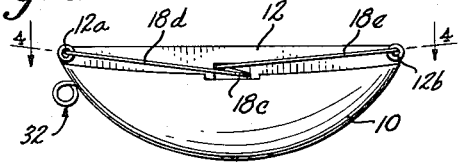
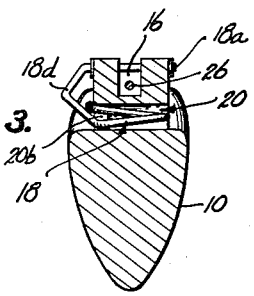
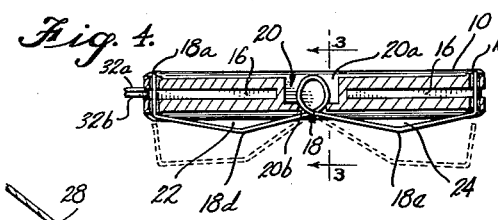
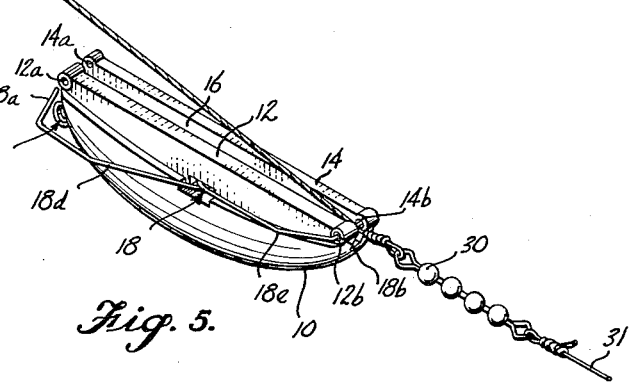
INVENTOR.
PHARES H. METZLER
BY Reynolds, Beach & Christensen
ATTORNEYS

United States Patent Office 3,043,044
Patented July 10, 1962

3,043,044
FISHING SINKERS
Phares H. Metzler, 12999 Standering Lane,
Seattle 66, Wash.
Filed June 9, 1959, Ser. No. 819,161
6 Claims. (Cl. 43—44.87)

This invention relates to fishing sinkers and more particularly concerns improvements in sinkers of the type generally disclosed in my United States Patent No. 2,425,069, August 5, 1947. The present invention is herein illustratively described by reference to the presently preferred embodiment thereof; however, it will be recognized that certain modifications and changes therein with respect to details may be made without departing from the essential features involved.

In salmon fishing, for example, it is often necessary to change to sinkers of different weights at frequent intervals. The changes may be necessary to find the depth of the fish in the first instance or to meet changing conditions such as variations in the direction or velocity of tidal currents, changes in depth of the fish, changes in the method of fishing, etc. It is important to provide a sinker which can be connected and disconnected easily and quickly from the line, particularly so in cold weather when the hands are numb, also when the fish are striking and time cannot be wasted. Sinkers suitable for this purpose should be inexpensive, easy to handle, and should incorporate the necessary versatility to satisfy the different fishing techniques used.

Moreover, for salmon fishing and the like it is desirable that the sinker be connectable to the line in such a way that the line may be free to slide readily through the sinker guides, because many fishermen consider this highly important in order to prevent a snapped leader caused by the quick lunge of a heavy fish reacting against the mass of the sinker weight. Alternatively, it is desirable that the same sinker be connectable to the line in fixed manner so as to preclude free sliding thereon, this being necessary or preferred for certain types of fishing. Again, it is often advantageous to provide a sinker which is basically slidable on a line but which is adapted to be clamped releasably to the line at a given position along its length some distance above the lure so that the sinker will be released to slide freely down the line when a fish strikes. These different modes of securement are used variously for spinning, mooching and trolling.

While there have been devised heretofore various types of sinkers intended to satisfy these different requirements, most have been awkward to manipulate and have required varying and relatively intricate line threading procedures difficult to perform rapidly or with cold hands. Those which have used mechanically movable latches or the like in lieu of threadable fixed line retainers have been unduly affected by corrosion or by crystallization of flexed metal elements. Many have been less than satisfactory from the manufacturing standpoint.

A general object of the present invention is to provide a versatile fishing sinker which overcomes the foregoing disadvantages and satisfies the above-described requirements.

Another object is to devise a fishing sinker of the readily disconnectible slip type employing resiliently actuated latch means not subject to becoming "frozen" by corrosion, nor to premature failure due to fatigue or crystallization of the metal because of excessive localized stresses therein. Moreover, such latch means is detachably mounted upon the sinker body without necessity of embedment in the sinker material so that its spring portion flexes freely and so that it may be replaced, if desired, at relatively low cost.

Another and more specific object is such a sinker having in association therewith a durable line connector which may cooperate with sinkers of similar construction but of different weights so as to expedite and facilitate quick changes in sinker size.

These and other objects and advantages of the invention together with the novel features thereof will be evident from the following description based on the accompanying drawings.

FIGURE 1 is a perspective view of the novel sinker components in separated relationship, shown for one type of use in conjunction with a fishing line.

FIGURE 2 is a side view of the sinker proper.

FIGURE 3 is a transverse sectional view taken on line 3—3 in FIGURE 4.

FIGURE 4 is a longitudinal sectional view taken on line 4—4 in FIGURE 2.

FIGURE 5 is an operating perspective view illustrating the sinker being connected to or disconnected from a fishing line in typical manner.

Referring to the drawings, the sinker proper comprises the heavy metal body 10 preferably of downwardly convex substantially crescent shape. Along its upper edge in this instance extend two parallel ribs 12 and 14 which are spaced apart transversely to define an open channel or groove 16 between them which extends the full length of the sinker and opens endwise. At its ends the rib 12 has apertures 12a and 12b aligned transversely with similar apertures 14a and 14b in the rib 14. These comprise locking apertures which cooperate with the substantially parallel latch elements 18a and 18b of the spring latch 18.

Just beneath the base of the groove 16 the sinker body has a transverse slot 20 which comprises a relatively wide (measured longitudinally of the sinker) portion 20a opening on one side of the sinker and a relatively narrow entrance throat or constriction 20b opening on the other side of the sinker, there being an abrupt retaining shoulder formed at the juncture of these two slot portions. Intermediate its ends the spring latch 18, which is preferably formed of a single length of non-corrosive spring metal wire, has a spring coil 18c which is preferably somewhat egg-shaped or tapered with the broader portion thereof lying adjacent to the adjoined shank portions 18d and 18e and with the narrow or tapered end thereof being directed away from these shank portions to enter the slot. Thus formed, the spring coil 18c, with its sides compressed together, is readily forced through the constricted slot entrance 20b and into the broader expanse 20a of the slot 20, and by virtue of its relatively blunt or broad base reacting against the shoulder formation the coil is retained in place in the slot yet in a manner permitting it to flex freely when the shank portions are sprung away from the sinker body when necessary to release the latch elements. However, the spring latch may be removed by pressing it forcibly back out of the slot, if desired, the end of the slot opposite its entrance being open to facilitate that operation, also for drainage. The installed position of the clip appears in FIGURE 4 wherein the latch elements 18a and 18b are lodged in the transversely aligned apertures 12a, 14a and 12b, 14b, respectively. They are sufficiently smaller in cross section than these apertures so as to avoid sticking in place due to corrosion, etc. Preferably the shank portions 18d and 18e are outwardly kinked or bent intermediate their ends, which thereby provide gaps 22 and 24 between these shanks and the adjacent sides of the sinker body facilitating insertion of a fingernail in order to grasp the shank portions to withdraw the latch ends 18a and 18b more readily from the apertures described.

In one embodiment of the invention there is associated with the sinker proper a line coupling comprising a length of relatively stiff wire 26 having connector eyes 26a and 26b formed at opposite ends thereof for securement to fishing line elements, such as the fishing line 28 connected to eye 26a and the swivel connector 30 interconnecting the eye 26b and a fishing leader 31. The length of the wire 26 between the eyes somewhat exceeds the overall length of the sinker so that the wire may be retained in the groove 16 by the latch elements 18a and 18b. Because of the relatively large size of the connector eyes 26a and 26b, the sinker is retained against sliding freely along the length of the line. Sinkers of the same or similar constructions may be exchanged with that connected to the coupling wire 26 simply by withdrawing first one of the latch elements 18a and then the other 18b and lifting the wire 26 out of the groove, whereupon, following a reverse procedure, a sinker of different weight may be installed on the coupling wire 26.

In case it is desired to provide a free sliding sinker on the line, the sinker proper is simply connected to the fishing line as in FIGURE 5, instead of to the coupling wire 26.

If desired, the sinker proper may be provided with a line clamp such as the resilient clamp 32 comprising two spring metal turns 32a, 32b placed in adjacent relationship so as to pinch and releasably hold a fishing line pressed down into the space between the coils. By mounting these spring coils on the end of the sinker body at an offset from the groove 16 the fishing line pressed into these coils will be deflected out of its normal alignment so that when a fish strikes, the resulting tension in the line tending to straighten it will snap the line out of the clamp 32 and permit free sliding of the sinker along the line.

Typically, the sinker body will be manufactured of a lead alloy such as 3% antimony and 97% lead. The latch 18 may be made of spring brass or other suitable resilient metal capable of resisting corrosion.

Because of the freedom of action of the spring coil 18c within the slot 20, the entire coil flexes when the spring shanks are deflected outwardly from the sinker body in order to withdraw the latch elements 18a and 18b from their locking apertures. This minimizes stress in the spring wire and thereby greatly defers ultimate weakening and failure due to crystallization of the metal. However, if the spring should become weakened over a long period of use, the same may be forced out of the slot 20 in the reverse direction by the use of any suitable instrument or tool and may be replaced by a fresh element. Also, manufacturing cost is reduced by avoiding the necessity of embedding the latch in the sinker body during molding of the latter.

These and other aspects of the invention will be evident to those skilled in the art based on the foregoing description of the presently preferred embodiment thereof.

I claim as my invention:

1. A fishing sinker comprising an elongated sinker body having a pair of longitudinally extending rib elements spaced apart transversely to define a substantially straight upwardly and endwise open groove formation along the upper side of such body through and along which a fishing line may extend substantially undeflected for free longitudinal sliding therein, said rib elements on respectively opposite sides of the body having sets of transversely aligned apertures formed at longitudinally spaced locations on the body located above the groove bottom, said sinker body having a transversely extending generally horizontal slot preformed therein at a longitudinal location intermediate the respective sets of apertures, said slot being narrow heightwise of the sinker body and having a relatively narrow entrance at one side of said body and widening in a horizontal plane toward the opposite side to form an internal retaining shoulder behind said entrance, and elongated spring latch means comprising oppositely extending shank portions interconnected by a spring coil formation insertable into said slot through said entrance by compressing the coil sides together to wedge the same through such entrance past said retaining shoulder, with the coil disposed in a longitudinal horizontal plane of the sinker, whereupon expansion of such coil entering the widened portion of the slot retains the coil against withdrawal, lodged against said shoulder, while permitting flexure of such coil freely in said slot, and latch elements carried by said shank portions and lodged removably in said respective sets of apertures under pressure of the spring recoil force to bridge across said groove and thereby retain a fishing line slidably in the base of such groove.

2. The sinker defined in claim 1, wherein the latch means comprises an integral length of spring wire the shank portions of which extend closely along the side of the sinker body and the latch elements of which comprise the ends of the wire angled to the respective shank portions.

3. The sinker defined in claim 2, wherein the shank portions are bent outwardly away from the sinker body intermediate their ends to facilitate grasping the same to withdraw the latch elements from the apertures.

4. The sinker defined in claim 3, wherein the coil retaining slot is also open on the side of the sinker body opposite the slot entrance to provide access to the spring facilitating its forceable ejection back through such entrance.

5. The sinker defined in claim 3, wherein the spring coil is of generally tapered form with its narrow end directed away from the shank portions to lead the coil into and through the slot entrance.

6. A fishing sinker comprising an elongated sinker body having a pair of longitudinally extending rib elements spaced apart transversely to define a substantially straight upwardly and endwise open groove formation along the upper side of such body through and along which a fishing line may extend substantially undeflected for free longitudinal sliding therein, said rib elements on respectively opposite sides of the body having sets of transversely aligned apertures formed at longitudinally spaced locations on the body located above the groove bottom, said sinker body having a transversely extending generally horizontal slot preformed therein at a longitudinal location intermediate the respective sets of apertures, said slot being narrow heightwise of the sinker body and having a relatively narrow entrance at one side of said body and widening in a horizontal plane toward the opposite side to form an internal retaining shoulder behind said entrance, and elongated spring latch means comprising oppositely extending shank portions interconnected by a spring coil formation insertable into said slot through said entrance by compressing the coil sides together to wedge the same through such entrance past said retaining shoulder, with the coil disposed in a longitudinal horizontal plane of the sinker, whereupon expansion of such coil entering the widened portion of the slot retains the coil against withdrawal, lodged against said shoulder, while permitting flexure of such coil freely in said slot, and latch elements carried by said shank portions and lodged removably in said respective sets of apertures under pressure of the spring recoil force to bridge across said groove and thereby retain a fishing line slidably in the base of such groove, said slot being also open on the side of the sinker body opposite the slot entrance to provide access to the spring facilitating its forceable ejection back through such entrance.

References Cited in the file of this patent

UNITED STATES PATENTS

| | | |
|---|---|---|
| 942,597 | Teasdale | Dec. 7, 1909 |
| 2,190,449 | Goldammer | Feb. 13, 1940 |
| 2,198,290 | Place | Apr. 23, 1940 |
| 2,425,069 | Metzler | Aug. 5, 1947 |
| 2,495,572 | Deutsch | Jan. 24, 1950 |
| 2,563,560 | Stafford | Aug. 7, 1951 |
| 2,579,713 | Tolle | Dec. 25, 1951 |
| 2,710,480 | Gehrig | June 14, 1955 |